United States Patent [19]

Downs et al.

[11] Patent Number: 4,993,403
[45] Date of Patent: Feb. 19, 1991

[54] METHOD AND APPARATUS FOR TRAPPING HEAT ENERGY

[76] Inventors: Charles W. Downs; Elaine I. Downs; Jennifer L. Downs, all of 8563 SE. Kane Rd., Gresham, Oreg. 97080

[21] Appl. No.: 166,999

[22] Filed: Mar. 11, 1988

[51] Int. Cl.⁵ .............................................. F24J 2/56
[52] U.S. Cl. ................................. 126/450; 126/443; 126/441; 126/436
[58] Field of Search ............... 126/450, 443, 432, 436, 126/901, 438, 439, 400, 441

[56] References Cited

U.S. PATENT DOCUMENTS

| | | | |
|---|---|---|---|
| 2,213,894 | 9/1940 | Barry | 126/443 |
| 3,853,114 | 12/1974 | Gaydos, Jr. | 126/443 |
| 3,924,604 | 12/1975 | Anderson | 126/270 |
| 3,981,293 | 9/1976 | Gillery | 126/271 |
| 3,987,780 | 10/1976 | Nozik et al. | 126/443 |
| 4,043,315 | 8/1977 | Cooper | 126/270 |
| 4,057,048 | 11/1977 | Maine | 126/271 |
| 4,136,674 | 1/1979 | Korr | 126/271 |
| 4,187,832 | 2/1980 | Tregoning | 126/443 |
| 4,209,222 | 6/1980 | Posnansky | 350/1.6 |
| 4,267,826 | 5/1981 | Hitt, Jr. | 126/443 |
| 4,326,501 | 4/1982 | Jardin | 126/436 |
| 4,340,035 | 7/1982 | Begun | 126/443 |
| 4,782,816 | 11/1988 | Salgado et al. | 126/432 |

Primary Examiner—Albert J. Makay
Assistant Examiner—Denise L. Ferensic
Attorney, Agent, or Firm—Klarquist, Sparkman, Campbell, Leigh & Whinston

[57] ABSTRACT

A heat trap for collecting heat energy includes an enclosure having an interior surface reflective with respect to heat energy within the enclosure and a heat absorbent exterior surface. Heat energy applied to the exterior surface of the enclosure is absorbed and communicated to the interior of the enclosure where it is trapped by means of the heat reflective interior surface. Heat energy is recovered from the enclosure for use as an energy source suitable for conversion to electrical energy.

8 Claims, 2 Drawing Sheets

METHOD AND APPARATUS FOR TRAPPING HEAT ENERGY

BACKGROUND OF THE INVENTION

The present invention relates generally to the collection and retention of heat energy and particularly to the collection and retention of heat energy derived from solar radiation.

Solar energy is a virtually inexhaustible energy source; when fossil fuels are no longer available, the sun will continue to make available its energy. While nuclear energy may be provided on a relatively indefinite basis, the environmental cost in the form of hazardous by-products is undesirable. Thus, solar energy is a prime candidate for a long term energy source and there is a need for apparatus which efficiently utilizes this energy source.

SUMMARY OF THE INVENTION

According to a principal embodiment of the present invention heat energy is trapped within an enclosure having an interior surface reflective with respect to heat energy within the enclosure, and a heat absorbent exterior surface. When heat energy is applied to the exterior surface of the enclosure, the energy is absorbed and communicated to the interior of the enclosure where it is trapped by virtue of the heat reflective interior surface. Heat energy within the enclosure serves as an energy source suitable for conversion to electrical energy.

In one aspect of the present invention, an enclosure for trapping heat is formed from mirror tiles having a fibrous heat absorbent material bound to the tile surface opposite that of the reflective surface, the reflective surface forming the interior surface of the enclosure and the heat absorbent material forming the exterior surface. Concentric transparent shells surround the enclosure and permit the passage of solar radiation therethrough, creating a greenhouse effect for elevating the temperature within the shells. Heat energy present at the exterior surface of the enclosure is then absorbed and trapped therein.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

DETAILED DESCRIPTION

Figure 1:
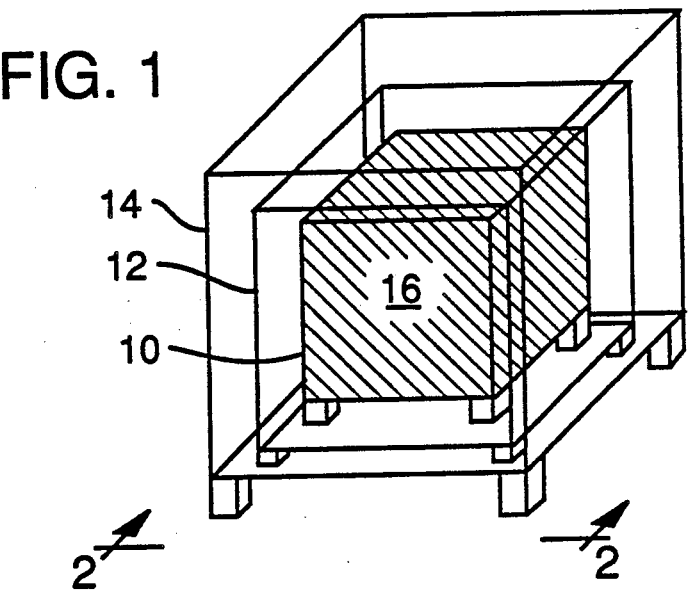
FIG. 1 is a perspective schematic view of a heat trap according to a principal embodiment of the present invention.
Figure 2:
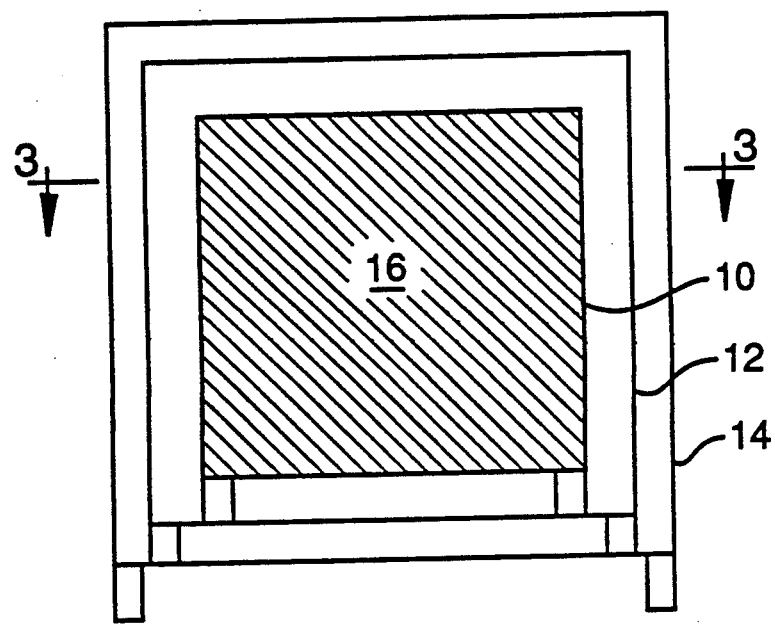
FIG. 2 is a side view of the heat trap of FIG. 1 taken along lines 2—2 of FIG. 1.
Figure 3:
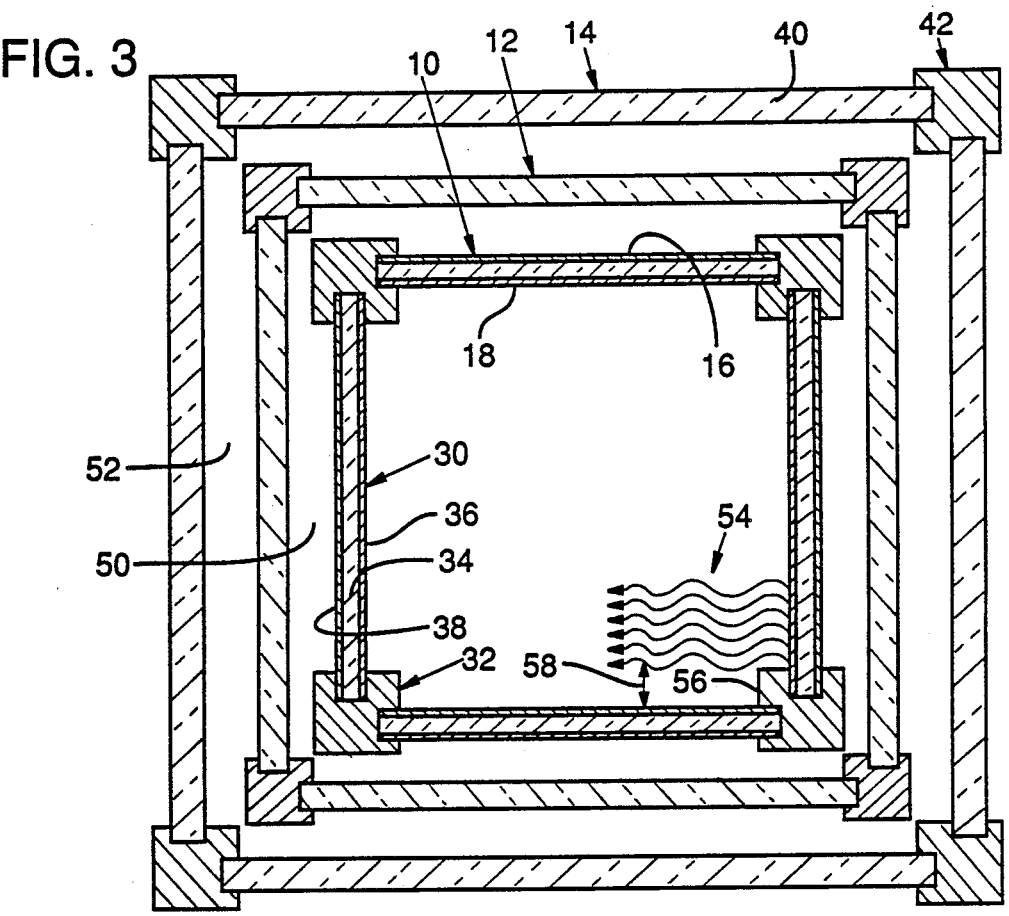
FIG. 3 is a cross sectional view of the heat trap of FIG. 2 taken along lines 3—3 of FIG. 2 illustrating details of a preferred form of construction.

In FIGS. 1–3, a heat trap in accordance with a principal embodiment of the present invention includes an enclosure 10 surrounded by an inner transparent shell 12 and an outer transparent shell 14, the shells 12 and 14 being disposed concentrically about enclosure 10. The exterior surface 16 of enclosure 10 is heat absorbent such that heat energy present at the exterior surface of enclosure 10 is communicated to the interior of enclosure 10. The inner surface 18 of enclosure 10 is heat reflective with respect to heat energy present within the enclosure. Thus, heat energy applied at the surface 16 is absorbed into enclosure 10 and held therein by virtue of reflective interior surface 18.

FIG. 3 shows a preferred form of construction for the heat trap of FIGS. 1–2 wherein conventional mirror tiles 30 mounted upon a frame 32 form a cubic enclosure 10. Mirror tiles found to be suitable for this purpose have been sold under the product name GLASS-TILE by Hoyne Industries, Inc., Los Angeles, Calif. Tiles 30 include a glass panel 34 with a reflective side 36 and a fibrous heat absorbent material 38 bound to the nonreflective side. Thus, the interior surface 18 of enclosure 10 comprises reflective sides 36 of tiles 30 and the exterior surface 16 of enclosure 10 comprises fibrous material 38. Concentric shells 12 and 14 are constructed in a manner similar to enclosure 10 but using ordinary glass panels 40 in conjunction with frames 42 to form cubic enclosures. While enclosure 10 and shells 12, 14 are shown as being cubic, it is understood that many shapes and dimensions can be used so long as the enclosure 10 has a heat absorbent exterior surface and an interior surface reflective with respect to heat energy therewithin. As an alternative to the conventional mirror tiles suggested above, an ordinary mirror, i.e., one without the fibrous material 38, has been found suitable for use in the heat trap having a coating of black paint on its backside.

The space between enclosure 10 and inner shell 12 forms a first thermal zone 50 while the space between inner shell 12 and outer shell 14 forms a second thermal zone 52. Solar radiation directed toward the heat trap passes through shells 12 and 14 to reach the exterior surface 16 of enclosure 10. The temperature within thermal zones 50 and 52 rises due to the well known "green house effect". As a result of heat developed in zones 50 and 52 and the incidence of solar radiation directly on enclosure 10, heat energy is present at the exterior surface 16 of enclosure 10 and absorbed there by the fibrous material 38. Heat energy absorbed by the fibrous material 38 is transferred to glass panel 30 by conduction and/or through panel 30 by radiation. Ultimately, the heat energy is communicated to the interior of enclosure 10 and resides therein as radiant energy. Radiant heat energy within enclosure 10 is reflected at the mirrored interior surface 18 of enclosure 10 and is trapped within enclosure 10. Thus, enclosure 10 forms a "one-way heat membrane" permitting the passage of heat energy primarily from the exterior to the interior of enclosure 10 rather than vice versa.

It is believed the heat energy within enclosure 10 is substantially static, i.e., no convection currents, and the configuration of the frame 32 contributes toward maintaining the incidence of radiant heat waves 54 substantially normal to the interior surface 18. A portion 56 of frame 32 lies between adjacent tiles 30 of enclosure 10 and defines a space, indicated by arrow 58, between each tile 30 and the heat waves 54 emanating from an adjacent tile 30. Heat waves 54 travel across the interior of enclosure 10 before reaching a portion of parallel interior surface 18, and the incidence of waves 54 upon surface 18 is believed to be substantially normal to surface 18.

Figure 4:
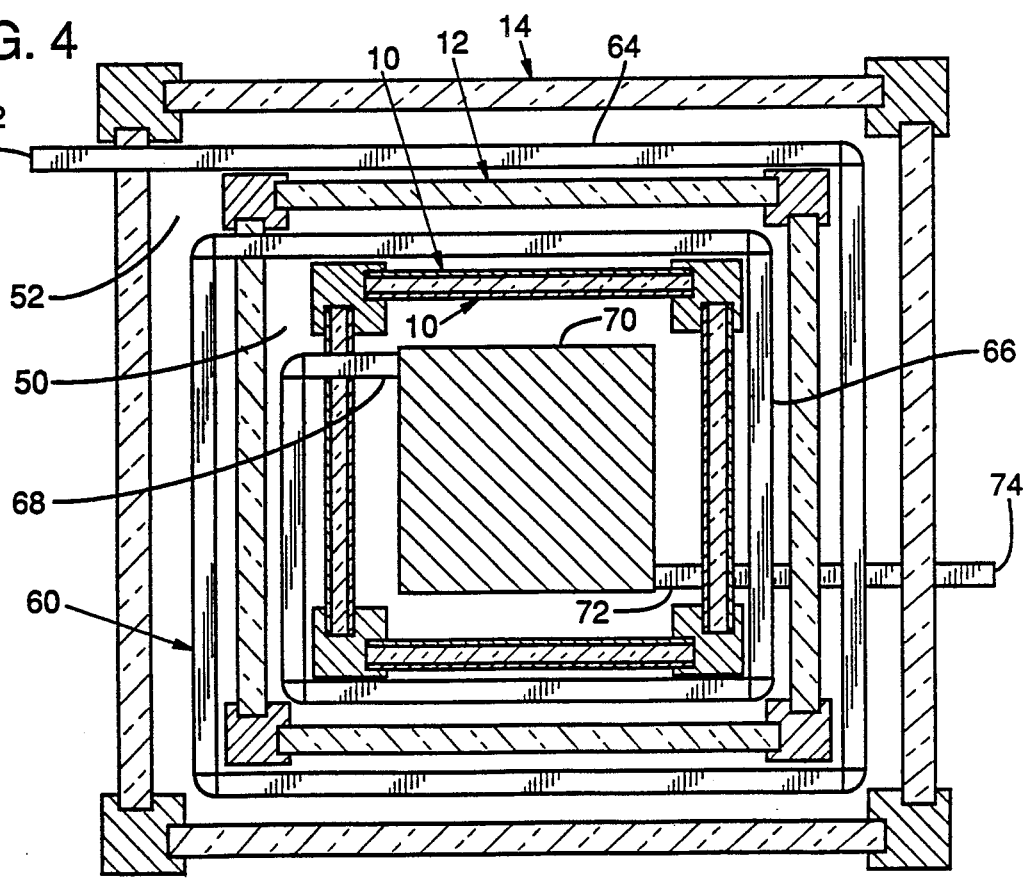
FIG. 4 is a horizontal cross-sectional view of a heat trap showing the addition of a steam circuit for removing heat energy therefrom.

FIG. 4 illustrates a steam circuit 60 used in connection with a heat trap similar to that of FIG. 3, for removing heat energy trapped within enclosure 10. Steam circuit 60 has an inlet 62 for introducing fluid from outside shell 14 into a first conduit section 64 of circuit 60 disposed within thermal zone 52. Conduit section 64 is coupled to a second conduit section 66 of circuit 60 which is disposed within thermal zone 50. Section 66 is coupled to a third conduit section 68 within enclosure 10 which feeds fluid within circuit 60 into a heat exchange radiator 70 positioned within enclosure 10. Fluid passing through radiator 70 leaves radiator 70 through an exit conduit section 72 which communicates the fluid from the heat trap at an outlet 74. Steam circuit 60 including radiator 70 is preferably disposed at the upper portion of the heat trap (parallel to the top wall) to be most effective in recovering heat.

Fluid introduced into inlet 62 is pre-heated as it passes through thermal zone 52 and thermal zone 50, and when it reaches radiator 70 it is heated by the heat energy trapped within enclosure 10. The fluid exits circuit 60 at a temperature above that which it entered circuit 60. Thus, the heat trap may be employed as an energy source for heating the fluid. The heated fluid is preferably brought to a high enough temperature to exit outlet 74 as steam which may be applied to a steam operated electric generator (not shown).

To further enhance operation of the heat trap, mirrors are placed about the heat trap and positioned to direct solar radiation toward the heat trap. A control mechanism may be used to maintain a maximum incidence of solar radiation upon the heat trap. Such a mechanism should include a tracking device for positioning mirrors to follow the location of the sun and continually maximize the solar radiation incident upon the heat trap.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for trapping heat energy comprising:
    an enclosure having a heat absorbent exterior surface and an interior surface reflective with respect to heat energy within the enclosure, the enclosure including a wall structure defining the exterior surface and the interior surface, the wall structure including at least one glass panel mirrored with respect to the interior of the enclosure, the glass panel having a heat absorbent material bound thereto and defining the exterior surface of the enclosure; and
    means adjacent the exterior surface of the enclosure for collecting heat, said means being adapted to permit radiant heat energy to pass therethrough and strike said heat absorbent material.

2. The apparatus according to claim 1 further comprising means for retrieving heat energy from the interior of the enclosure.

3. The apparatus according to claim 2 wherein the means for retrieving heat energy from the interior of the enclosure comprises a fluid circuit having a portion disposed within the enclosure, an inlet for introducing fluid into the conduit portion within the enclosure, and an outlet for collecting fluid from the conduit portion within the enclosure.

4. An apparatus for trapping heat energy derived from solar radiation and providing the trapped energy as an energy source, the apparatus comprising:
    an enclosure formed of glass panels having mirrored surfaces on the interior of the enclosure and a heat absorbent material bound to the exterior surface of the enclosure;
    a first transparent shell surrounding the enclosure and adapted to permit the passage of solar radiation therethrough; and
    means for recovering heat energy trapped within the enclosure for utilization as an energy source.

5. The apparatus according to claim 4, wherein the means for recovering heat energy from the enclosure comprises:
    a fluid circuit having an inlet for introducing fluid into the circuit, a conduit section disposed partially within the enclosure for communicating fluid in the circuit through the enclosure, and an outlet for recovering fluid from the circuit.

6. An apparatus for trapping heat energy derived from solar radiation and providing the trapped energy as an energy source, the apparatus comprising:
    a first transparent shell;
    a second transparent shell substantially surrounded by said first transparent shell and spaced therefrom to define a first thermal region therebetween;
    an enclosure substantially surrounded by the second transparent shell and spaced therefrom to define a second thermal region therebetween, the enclosure having an opaque absorbent material as an exterior surface thereof and a mirrored interior surface reflective with respect to heat energy within the enclosure; and
    a fluid circuit having an inlet for introducing fluid into the fluid circuit and an outlet for recovering fluid from the fluid circuit, portions of said fluid circuit being disposed within said first and second thermal regions and within said enclosure for elevating the temperature of fluid within the fluid circuit by way of heat energy within said first and second thermal regions and by way of heat energy within said enclosure, the fluid of elevated temperature being available as an energy source at the outlet of the fluid circuit.

7. An apparatus for trapping heat energy comprising:
    a hollow enclosure formed of an opaque wall structure including at least one glass panel, an exterior surface of said enclosure including a heat absorbent material, an interior surface of said enclosure being reflective with respect to heat energy within the enclosure; and
    means adjacent the exterior surface of the enclosure for collecting heat, said means being adapted to permit radiant heat energy to pass therethrough and strike the exterior surface of said enclosure.

8. An apparatus for trapping heat energy comprising:
    a hollow enclosure defined by an opaque wall having an exterior surface and an interior surface, the exterior surface being adapted to receive and absorb radiant heat energy, the exterior surface of the enclosure including a heat absorbent material bound to a glass panel of the enclosure, said enclosure wall being adapted for transmission of heat energy to the interior surface thereof so as to heat the same whereby heat energy is radiated from the interior surface, the interior surface being reflective with respect to radiant heat energy within the enclosure whereby heat will be collected within said enclosure to increase the temperature of atmosphere therein, said glass panel being mirrored with respect to the interior of the enclosure.

* * * * *